C. OSADA.
COOKING UTENSIL.
APPLICATION FILED MAR. 6, 1913.
1,089,664.
Patented Mar. 10, 1914.
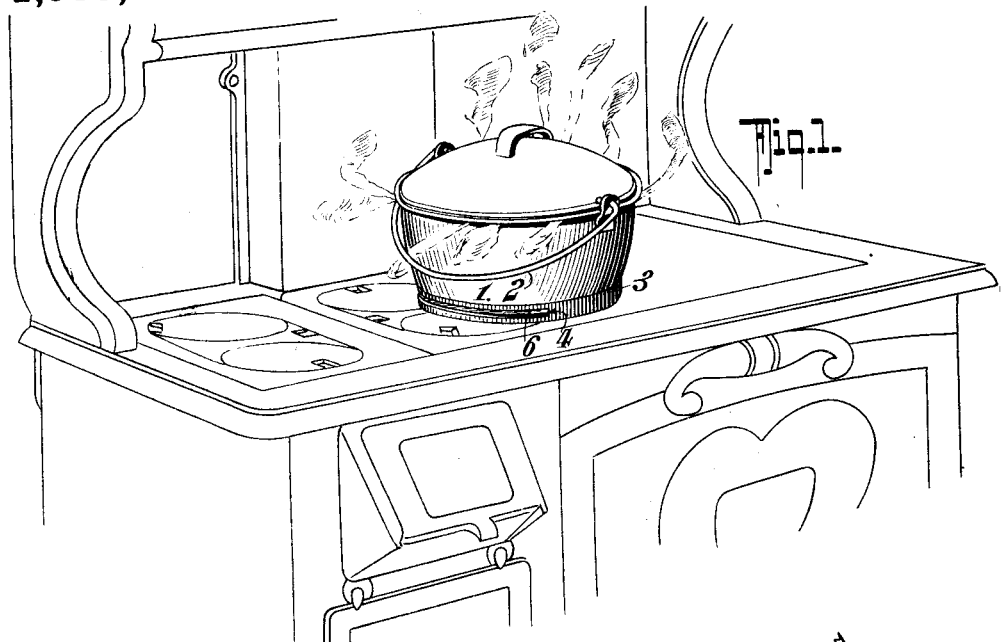
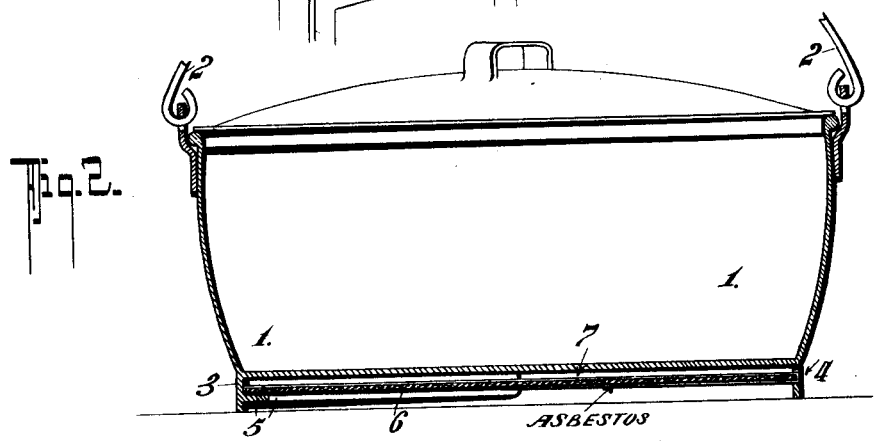
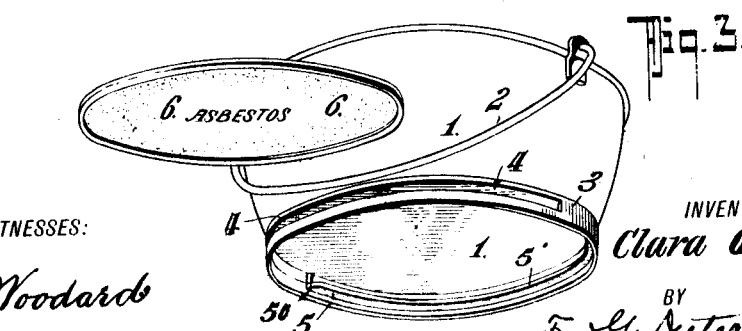
WITNESSES:
H. Woodard
Robert Grunwell
INVENTOR
Clara Osada,
BY
Fred G. Dieterich
ATTORNEYS

UNITED STATES PATENT OFFICE.

CLARA OSADA, OF DENVER, COLORADO.

COOKING UTENSIL.

1,089,664.  Specification of Letters Patent.  Patented Mar. 10, 1914.

Application filed March 6, 1913. Serial No. 752,332.

*To all whom it may concern:*

Be it known that I, CLARA OSADA, residing at Denver, in the county of Denver and State of Colorado, have invented a new and Improved Cooking Utensil, of which the following is a specification.

This invention relates to improvements in that class of kettles or cooking utensils generally used for preserving and for cooking cereals, and it has for its object to provide an improved utensil of the type stated of a simple and economical nature, in which the bottom is especially designed for cooking in a quick and effective manner, and without danger of burning the substance being cooked.

In the use of the ordinary types of kettles for cooking cereals and preserving fruits it is difficult to cook without burning, and in case of cereals it has usually required a double boiler for cooking the same, which makes the process of cooking very slow, and when cooking preserves unless a deflector is used between the stovetop and the bottom of the kettle, the fruit is very apt to cake on the bottom and sides of the boiler. To overcome these objectionable features in cooking, and to produce a utensil that can be made and sold at practically the same cost of the ordinary types of cooking kettles, I have provided an improved construction of kettle in which the bottom is especially designed for removably receiving a supplemental bottom or deflector made of asbestos or other non-combustible material, and which can be quickly removed when it is desired to use the kettle for a quick boiling.

With other objects in view that will be hereinafter referred to, my invention consists in a kettle that embodies the peculiar features of construction and coöperative arrangement of parts, all of which will be hereinafter explained, specifically pointed out in the appended claims and illustrated in the accompanying drawing, in which:—

Figure 1 is a perspective view of my kettle, the same being shown as in use. Fig. 2 is a vertical cross section thereof, the supplemental bottom being in place, and Fig. 3 is an inverted perspective view of the kettle, the supplemental bottom being removed and separately shown.

In the practical embodiment of my invention, 1 designates an ordinary shaped cooking kettle, having the usual handle or lift 2.

In my construction the kettle bottom has a deep pendent flange 3, that is cut out to form a horizontal slotway 4 which extends approximately one-half of the circumference of the flange, and the said flange on the remaining part thereof has an inwardly projected rib 5, the ends 50 of which terminate at or near the inner edge of the slotway 4.

6 designates a supplemental or extra bottom which preferably is the commercial type of asbestos stove plate, the size thereof being such that it can be readily slipped edgewise through the slotway 4 and be caused to rest and be supported upon the segmental flange 5, and in practice the said bottom 6 is of such thickness that when slipped into position under the kettle there remains a space 7 of at least one eighth of an inch, to provide for a free circulation of air between the kettle bottom proper 9 and the asbestos bottom 6, such arrangement being provided so that the asbestos bottom can never get too hot and at the same time prevent the kettle bottom proper from getting so hot that it will burn the substance being cooked in the kettle. To positively hold the top of the asbestos bottom away from the kettle bottom, the slotway 5 is so cut that its upper edge is in a plane below the kettle bottom as shown.

By arranging the kettle bottom in the manner desired, the kettle can be used in the ordinary way when so desired, since the extra bottom 6 can be almost instantly removed or replaced, it being apparent that when applied, the bottom 6 is so held that it will not readily fall out of position during the ordinary handling of the utensil.

From the foregoing taken in connection with the drawing, the advantages and the complete arrangement of my invention will be readily apparent. The same is exceedingly simple and it can be used for any purpose for which devices of the kind to which my invention belongs are usually employed.

Having thus described my invention, what I claim is:—

1. A cooking utensil having a pendent flange, said flange being horizontally slotted, and a removable bottom, the said bottom being slidable through the said slotted flange and supportable on the flange.

2. As a new article, a cooking utensil having a pendent resting flange, said flange having a horizontal slotway extended a portion of its length, the upper edge of said slotway being some distance below the bottom of the utensil, a bottom plate, said bottom plate being edgewise insertible through the said slot, and means on the inner face of the flange for supporting the said plate.

3. As a new article, a cooking utensil having a pendent flange, said flange having a horizontal slotway at a point slightly below the bottom of the utensil, and an internal rib at a point below the slotway, and a supplemental bottom edgewise slidable through the said slotway in the flange and supportable on the said internal rib.

CLARA OSADA.

Witnesses:
A. D. QUAINTANCE,
GUY B. ELLERMEIER.